Sept. 12, 1944.  A. J. FETTIG  2,358,154
CALCULATING MACHINE
Filed Dec. 24, 1937  11 Sheets-Sheet 1

INVENTOR
Arthur J. Fettig
BY
Davis, Lindsey, Smith & Shonts
ATTORNEYS

Sept. 12, 1944.  A. J. FETTIG  2,358,154
CALCULATING MACHINE
Filed Dec. 24, 1937    11 Sheets-Sheet 3

INVENTOR
Arthur J. Fettig
ATTORNEYS

Sept. 12, 1944.  A. J. FETTIG  2,358,154
CALCULATING MACHINE
Filed Dec. 24, 1937  11 Sheets-Sheet 4

INVENTOR
Arthur J. Fettig
BY
ATTORNEYS

Sept. 12, 1944.    A. J. FETTIG    2,358,154
CALCULATING MACHINE
Filed Dec. 24, 1937    11 Sheets-Sheet 5

INVENTOR
Arthur J. Fettig
BY
ATTORNEYS

Sept. 12, 1944.   A. J. FETTIG   2,358,154
CALCULATING MACHINE
Filed Dec. 24, 1937   11 Sheets-Sheet 6

INVENTOR
Arthur J. Fettig
BY
ATTORNEYS

Sept. 12, 1944.  A. J. FETTIG  2,358,154
CALCULATING MACHINE
Filed Dec. 24, 1937   11 Sheets-Sheet 7

INVENTOR
Arthur J. Fettig
BY
Davis Lindsey Smith & Shorts
ATTORNEYS

Sept. 12, 1944.  A. J. FETTIG  2,358,154
CALCULATING MACHINE
Filed Dec. 24, 1937   11 Sheets-Sheet 8

INVENTOR
Arthur J. Fettig
BY
Davis Lindsey Smith & Shants
ATTORNEYS

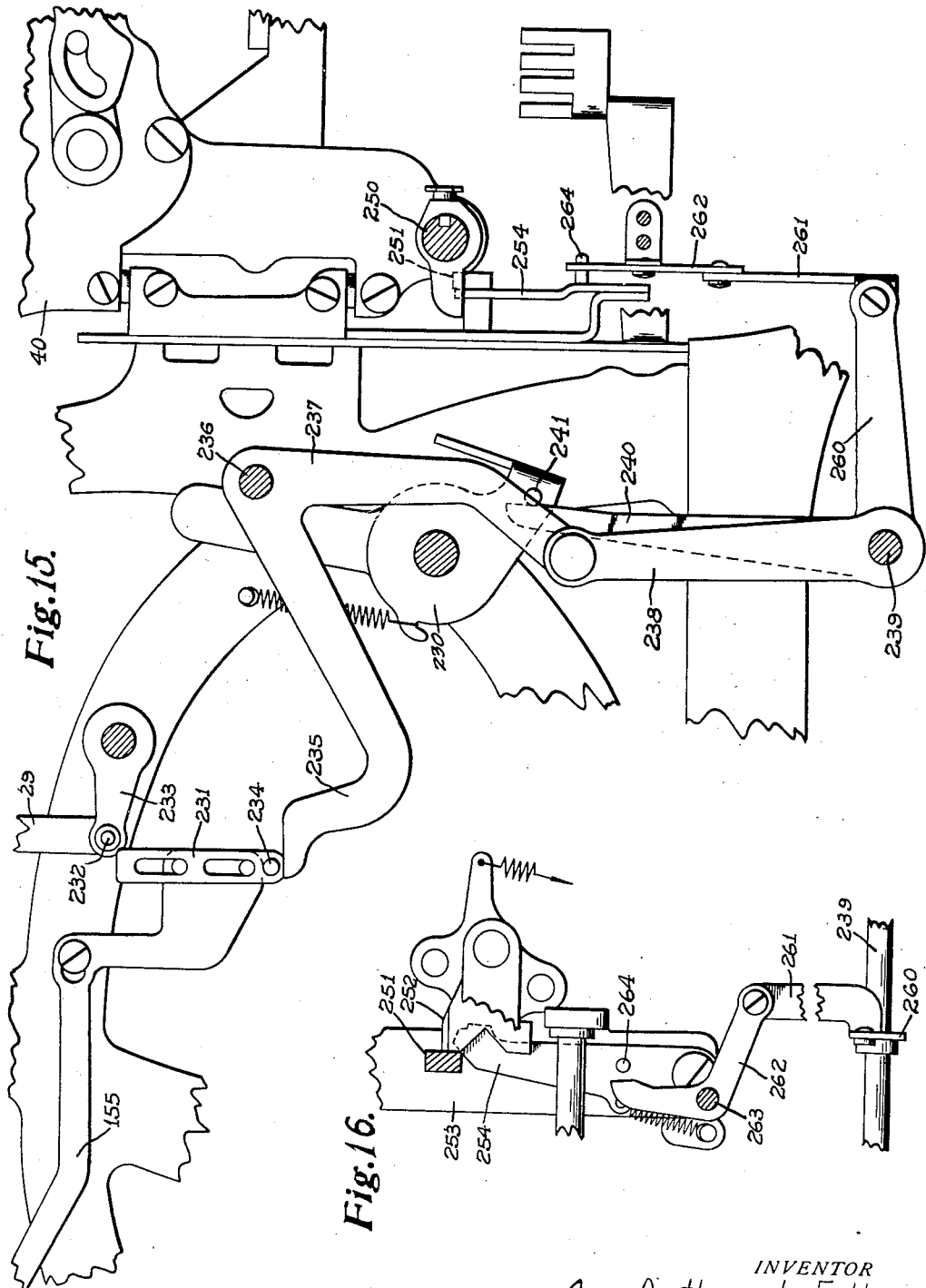

Sept. 12, 1944.　　　A. J. FETTIG　　　2,358,154
CALCULATING MACHINE
Filed Dec. 24, 1937　　　11 Sheets-Sheet 10

INVENTOR
Arthur J. Fettig
BY
Davis Lindsey Smith
ATTORNEYS

Sept. 12, 1944. A. J. FETTIG 2,358,154
CALCULATING MACHINE
Filed Dec. 24, 1937 11 Sheets-Sheet 11

INVENTOR
Arthur J. Fettig
BY
Davis Lindsey Smith & Shorts
ATTORNEYS

Patented Sept. 12, 1944

2,358,154

UNITED STATES PATENT OFFICE 2,358,154

CALCULATING MACHINE

Arthur J. Fettig, Detroit, Mich., assignor to Burroughs Adding Machine Company, Detroit, Mich., a corporation of Michigan Application December 24, 1937, Serial No. 181,550

14 Claims. (Cl. 235—60)

This invention relates to a calculating machine, and it is concerned particularly with an automatic control for such a machine whereby, upon the indexing of an item in said machine, the operator will be notified whether said item, if entered in the registering mechanism, or totalizer, of the machine, will cause the total accumulated in said registering mechanism to reach an undesired condition.

The invention finds its greatest usefulness in the prevention of overdrafts or negative totals. In bookkeeping and accounting work it often happens that an item to be subtracted is larger than the amount previously accumulated in the registering mechanism. An example of this is an overdraft by a customer of his bank account. Calculating machines have heretofore been provided with various devices for notifying the operator of an overdraft, but this notification has always been given after the overdraft occurs, such notification being by means of a "negative total lock," a "negative total signal," or some similar device. With such devices, the subtracted item is entered in the register mechanism, is printed, and the total in the registering mechanism goes to negative condition, after which the operator is notified of that condition. This after-the-fact notification has certain disadvantages. For example, overdrafts are not ordinarily permitted by banks. If a check should arrive that overdraws an account, the final procedure is to send it back marked "Not sufficient funds." This means that it should not be posted to the customer's account, but, with prior devices, it was posted before the operator could discover that it would overdraw the account. The result was that the posting operations usually had to be done over again, as will be presently explained in more detail.

The present invention is a decided advance in the art in that it notifies the operator as soon as an item is indexed in the machine whether, if such item is entered in the register or totalizer, the total in the register will change from positive to negative.

The general object of the invention is to provide an improved automatic control for an accounting machine.

A more particular object is to provide an improved accounting machine in which, upon indexing an item in the machine, the operator will be automatically notified whether said item, if entered in the registering mechanism, will cause the total in said registering mechanism to reach an undesired condition.

A still further object is to provide an improved accounting machine in which, when an item is indexed in said machine, the operator will be notified if said item is such that its entry in the registering mechanism would change the total therein from positive to negative.

Other and more particular objects will hereinafter appear.

An embodiment of the invention is shown in the accompanying drawings in which:

Fig. 15 is a partial right-side sectional elevation of the modification in which register selection and carriage tabulation are controlled.

Fig. 16 is a detail view of a portion of the tabulating mechanism control.

The invention is shown applied to a Burroughs accounting machine, but it is to be understood that it may be applied to a wide variety of calculating and accounting machines, the illustration with the Burroughs machine being by way of example only. The machine illustrated is that known as the "Burroughs high keyboard machine," the general features of which are quite well known and shown in many prior patents. This machine is equipped with all the usual features employed in such machines but not all of them have been illustrated in detail, as illustration and description of them would make the application unduly cumbersome. Instead, the main features have been illustrated, and they will be briefly described.

General machine features

Figure 1:
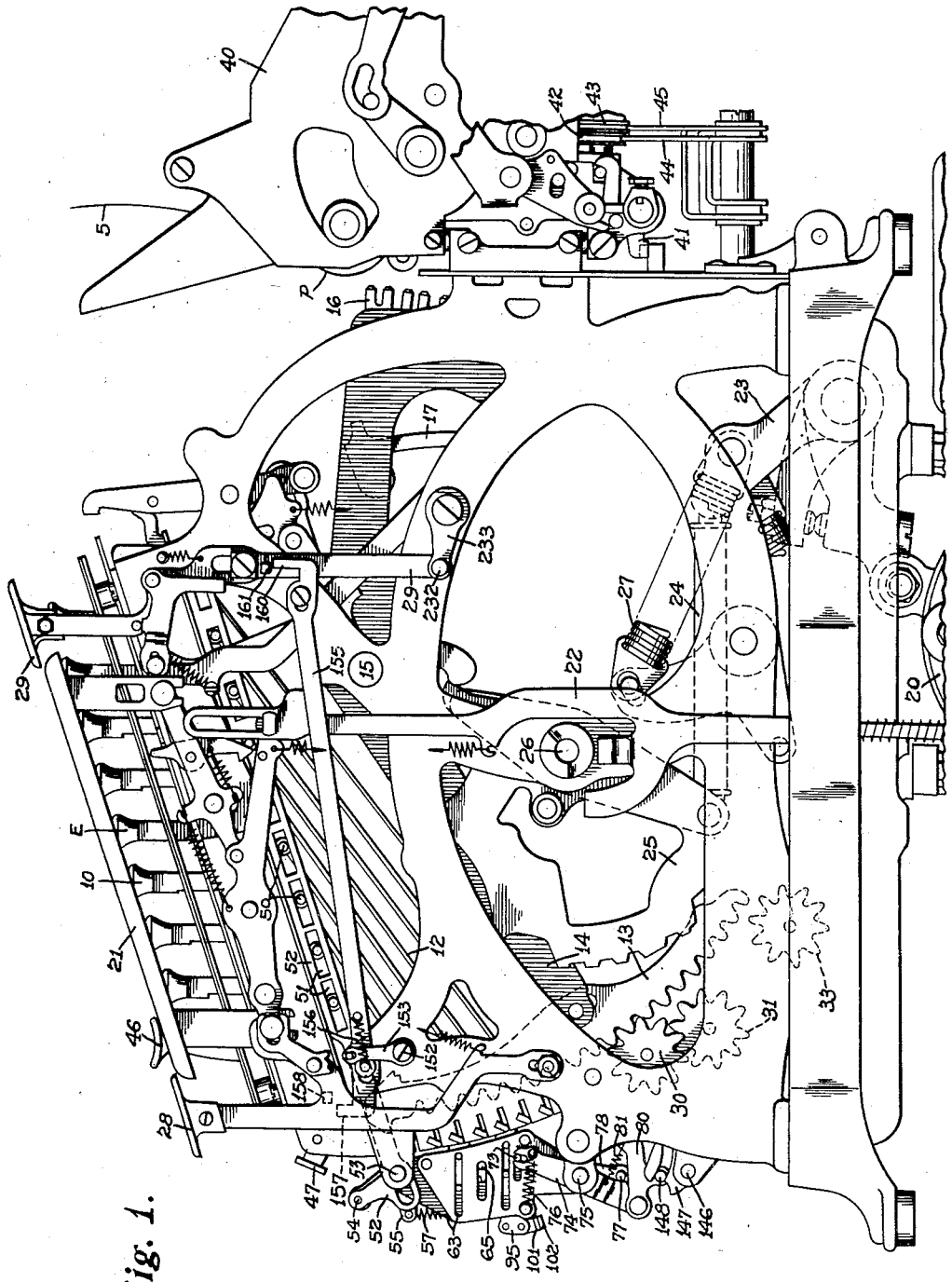
Figure 1 is a right side elevation of a Burroughs machine with the invention applied thereto, the parts being shown in normal position.

Items are indexed in the machine by depressing selected amount keys 10 of which there are usually nine banks, orders, or rows, with nine keys in each bank. When any key of a bank is depressed, it rocks its bell crank lever 11 (Fig. 2) to move its stop wire 12 (Fig. 1) into position to arrest the actuator 13 for the bank, or order, in which the key is located. The actuators are in the form of racks carried by levers 14 pivoted at 15. The rear ends of the levers carry type 16. At the appropriate time in the operation of the machine, a printing mechanism, of which a type hammer 17 is shown in Fig. 1, is operated to drive the type into engagement with a work sheet 5 held about the platen P.

After an item has been indexed, the machine is given a cycle of operation by means of a motor 20. This cycle is usually initiated by depressing a motor bar 21 that raises a link 22, the motor drive being a well-known part of Burroughs machines and described in Vincent Patent No. 866,750. The motor acts to rock a crank 23 clockwise, and this crank, acting through a link 24, rocks a full-stroke sector 25 counterclockwise about its pivot 26. After the crank 23 has been rocked a predetermined distance clockwise, it is released, whereupon it is returned by springs 27 which were tensioned during the clockwise movement of the crank. The first half of the movement of the parts is sometimes referred to as the "forward stroke" of the machine, and the latter half the "return stroke." The entire operation comprises a cycle of machine operation.

A cycle of operation may also be initiated by either of two special bars or keys 28 and 29 which are connected with the main motor bar mechanism.

During the first half of a machine cycle the actuators 13 are released, whereupon they descend to differential positions determined by the amount keys depressed. The type 16 on the ends of levers 14 are thus differentially positioned also, and, after they have been positioned, the printing mechanism operates to drive the type against the record material about the platen.

The machine illustrated has a main add-subtract registering or totalizing mechanism of the tumbling type (Fig. 1) comprising a set of add pinions 30, meshing with a set of subtract pinions 31. When addition is to be performed, the add pinions are engaged with the actuators after the latter have been differentially positioned and prior to their return to normal. When subtraction is to be performed, the time of engagement is the same but the subtract instead of the add pinions are engaged with the actuators. The selection of the add or subtract pinions for cooperation with the actuators is determined by means of a subtract lever 32, shown in Fig. 3. The manner in which this lever controls the tumbling of the totalizing mechanism is described in Pasinski Patent No. 1,778,506.

The machine also has a plurality of multiple registers 33 (Fig. 1), any one of which may be engaged with the actuators as described in Pasinski Patent No. 1,911,768.

The machine is arranged to print in different columns on the record material held by the platen P and the columnar printing is automatically controlled. For this purpose a traveling paper carriage 40 (Fig. 1) is provided which is urged to the left, viewing the machine from the front, by a carriage spring (not shown) and automatically returned to the right by a carriage return mechanism such as described in Patent No. 1,580,534. The movement of the carriage to the left is under the control of a tabulating mechanism of which parts 41 are shown in Fig. 1, the arrangement being such that, during the latter half of a cycle, the tabulating mechanism is operated to release the carriage for movement to its next column. The tabulating mechanism is shown and described in said Patent No. 1,580,534.

Numerous functions of the machine are controlled automatically in accordance with the column in which printing occurs. This control is exercised by the paper carriage which supports a number of cam rolls 42, 43 (Fig. 1) that operate on levers 44, 45 to position certain parts of the machine so that the latter, when operated, will perform predetermined functions. The cam roll 42 and lever 44 control subtraction in the machine illustrated.

Totals may be taken by depressing a total key 46 (Fig. 1), provision being made for taking negative as well as positive totals, this operation being described in Rinsche Patent No. 1,172,484. The machine has an overdraft mechanism of which parts are shown at 47 in Fig. 1, said mechanism being illustrated and described in said Rinsche Patent No. 1,172,484.

Automatic predicting means

As previously stated, the machine acts automatically when an item is indexed in the machine, to inform the operator whether said item, if entered in the registering mechanism, will cause the total therein to reach an undesired condition, such as a negative condition. In the main embodiment shown, the signal consists in blocking the motor bar so that the operator cannot depress it. This amounts not only to a signal but it also disables a portion of the machine to prevent its operation.

The result is accomplished by providing a mechanism that is responsive to the indexing means of the machine and which is also sensitive to the numerical condition of the registering mechanism.

Figure 2:
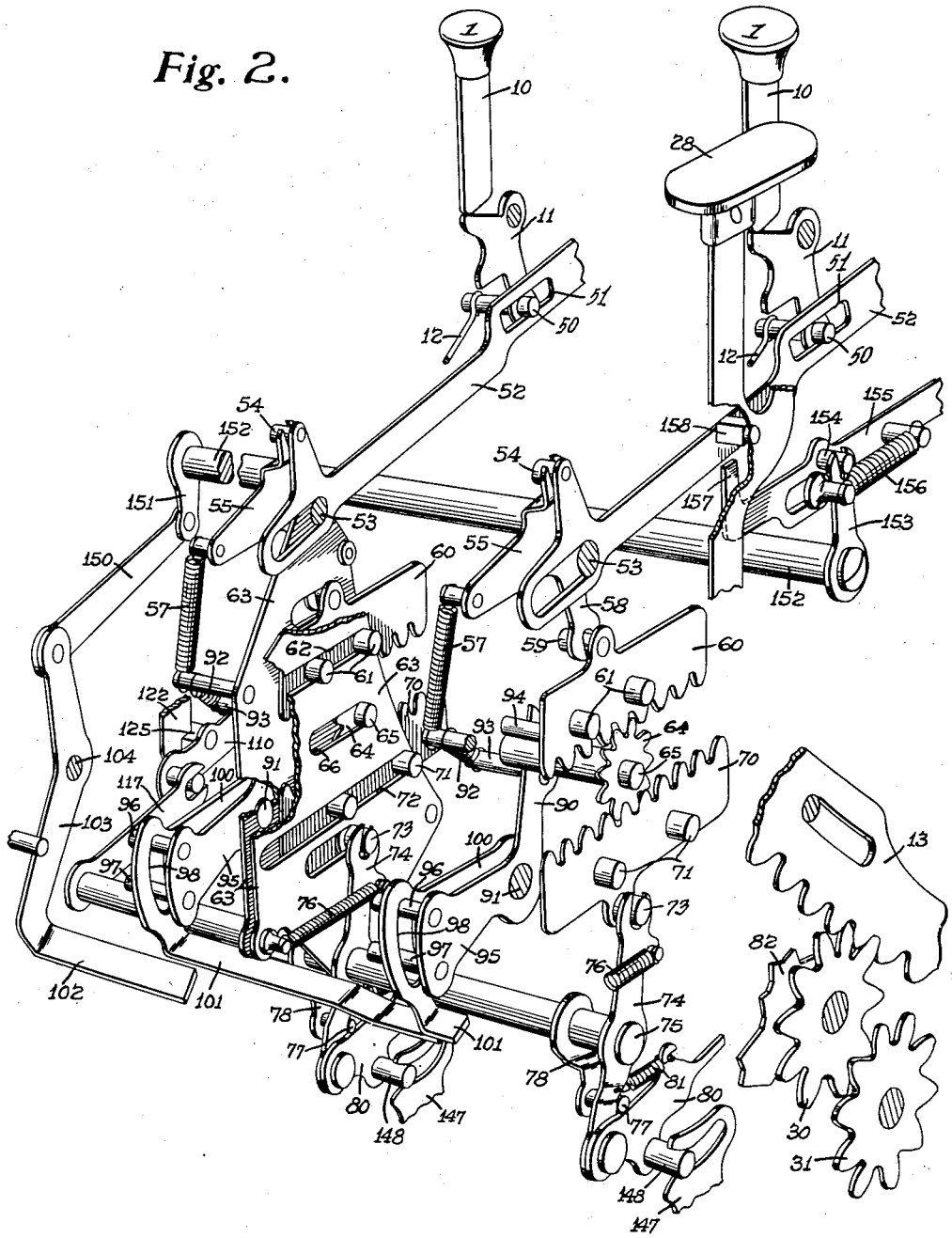
Fig. 2 is a partial perspective view from the front right corner of the machine showing two orders, or banks, of the machine with the invention applied thereto, the parts being in normal condition.

Figure 2 shows the mechanism associated with two banks or orders of the machine and with the "1" key of each bank illustrated. It will be understood that a similar mechanism is supplied for each of the other banks.

As previously explained, when one of the amount keys 10 is depressed, it rocks its bell crank lever 11 counterclockwise (Fig. 2) and thereby moves its index wire 12 to control the actuator of its bank. Each of the bell crank levers 11 is provided with a stud 50 positioned in a slot 51 in a slide 52 that extends along the entire row of keys for each order. The position of the different studs 50 for the keys of a row varies as illustrated in Figure 1, the stud for the "1" key being at a maximum distance from the end of its slot, whereas the stud for the "9" key is very near the end of its slot. Thus, when the "1" key is depressed, its stud 50 may move rearward a considerable distance before moving the slide 52, whereas, when the "9" key is depressed, its stud 50 engages the end of its slot 51 almost immediately and moves slide 52 a considerable distance. In this manner, the slide 52 of any row, or order, is moved different distances depending upon which key of its row is depressed.

The forward end of the slide 52 is slidably supported on a shaft 53, and said forward end has an upwardly projecting portion carrying a stud 54 positioned in a slot in a member 55 pivoted loosely on said shaft 53. A spring 57 urges the member 55 counterclockwise (Fig. 2) and thereby urges the slide 52 forwardly toward its normal position. The member 55 also has a downwardly extending arm 58 having a slotted end engaging over a stud 59 on a rack 60. This rack is supported and guided to move forward and back by studs 61 (Fig. 2) that extend from each side of it and which are movable in slots 62 in stationary partition plates 63. There are two of these plates for each order as shown at the left side of Fig. 2. The partition plates for the first bank are omitted for convenience in illustrating the other parts.

The rack 60 is in constant mesh with a pinion 64 carried by a stud 65 that slides in slots 66 in the partition plates 63. These partition plates serves to hold the racks 60 and the pinions 64 in proper relation and at the same time permit forward and rearward movement of the racks and the studs carrying the pinions 64.

When an amount key is depressed, the slide 52 of its bank is moved rearward a distance proportional to the value of the key depressed. This rocks the member 55 clockwise and thereby moves the rack 60 forward a distance proportional to the value of the depressed key.

The pinion 64 is also in mesh with a lower rack 70, having studs 71 slidably mounted in the slots 72 in the partition plates 63. The lower rack 70 has a stud 73 engaging the slotted end of a lever 74 pivoted on a shaft 75 and urged counterclockwise by a spring 76 against a limit stud 77 on an arm 78 fixed to the shaft 75. The lower end of lever 74 has a feeling or sensing member 80 pivoted to it, said member being urged counterclockwise by a spring 81, against said limit stud 77. The sensing member 80 is adapted to engage the stepped surface of a cam 82 fixed to the add pinion 30 of the totalizing mechanism. The steps on the cam 82 corresponding to the successive positions of the totalizer pinion for the values "0" to "9" are of regularly increasing radii. At an appropriate time the sensing or feeling members of all orders are caused to move into engagement with the stepped cams of the totalizer pinions which movement rocks the levers 74 counterclockwise and thus tends to move the lower rack 70 forward. The distance that the rack 70 moves is proportional to the 9—complement of the digital value represented by the position of the totalizer pinion. When a totalizer pinion is in "0" position, its feeler 80 moves the maximum distance and its rack 70 is moved its maximum distance. When said totalizer pinion is in its "9" position, the feeler 80 moves its shortest distance and the rack 70 moves its minimum distance.

From the foregoing it will be clear that, when an amount key in a given row is depressed, its upper rack 60 is moved forward a distance proportional to the digital value of the depressed key and, when the sensing member 80 for the same order senses the corresponding register pinion 30, the lower rack 70 is moved forward a distance proportional to the 9—complement of the digital value represented by the position of the register pinion 30. Each of the two racks 60 and 70, when it moves forwardly, rolls the control pinion 64 forwardly on the other of the two racks so that the control pinion moves forwardly one half of the sum of the forward movements of the two racks. The distance that this control pinion 64 is moved determines the nature of the control of the machine that is exercised. The position occupied by the control pinion 64 in any order when the two racks 60 and 70 have moved forwardly a combined distance of 9 steps plus the minimum distance which the rack 70 moves when its sensing feeler 80 contacts the "9" step on the cam 82, the control pinion 64 then being half of that total distance forwardly of its normal position, will hereinafter be termed, for convenience, the "neutral" position of the control pinion.

For example, assume, first, that no amount is indexed on the keys and that the totalizer pinions 30 are in "0" position. The sensing feelers 80 will move their maximum distance, which is 9 steps more than the minimum distance the lower racks 70 will move forwardly their maximum distance, or 9 steps more than the minimum distance. The upper rack 60 remains stationary. The result is that the rack 70 will roll the pinion 64 forward to its "neutral position."

Next, assume that the "4" key in a given order or bank is depressed and that the totalizer pinion 30 in the same order is in "4" position. The rack 60 for that order will move forward four steps and the rack 70 for the same order will be moved forward the minimum distance plus a further 9—4 or 5 steps to a position corresponding to the "4" position of the totalizer pinion 30, the position of the parts being shown in Fig. 5. The two racks 60 and 70 move the pinion 64 forward to its "neutral" position, the same as in the example first assumed.

Assume, next, that a totalizer add pinion 30 is in its "9" position. When sensing member 80 moves, it moves its minimum distance and rack 70 moves the minimum distance only. It will be evident that, if any key of a value lower than "9" is depressed, rack 60 will not move its full distance of 9 steps and, hence, the pinion 64 will not be moved to "neutral" position. If the "9" key is depressed, the rack 60 will move 9 steps forwardly and the pinion 64 will be moved to its "neutral" position.

Assume next that the totalizer pinion is in its "4" position and that the "5" key is depressed as would be the case if 5 were subtracted from 4. The lower rack 70 will move forward 9—4 or 5 steps beyond the minimum distance to a position corresponding to the "4" position of the register pinion. The upper rack 60 moves forward five steps, from which it will be clear that the total movement of the two racks 60 and 70 is more than 9 steps in addition to the minimum movement of the rack 70 and the control pinion will be moved forward beyond its "neutral" position. When this occurs, certain mechanism is controlled that will be presently described.

Assume, next, that the totalizer pinion 30 is in "0" position. When the sensing member 80 moves, it moves its maximum distance and, hence, the lower rack 70 is moved a maximum distance so that if no amount key were depressed, the control pinion 64 would move to "neutral" position. It will be apparent that, if any amount key is indexed under these conditions, the control pinion will be moved forward beyond its "neutral" position. Thus, if any digit is subtracted from "0," a condition exists for moving pinion 64 forward beyond its "neutral" position.

Figure 6:
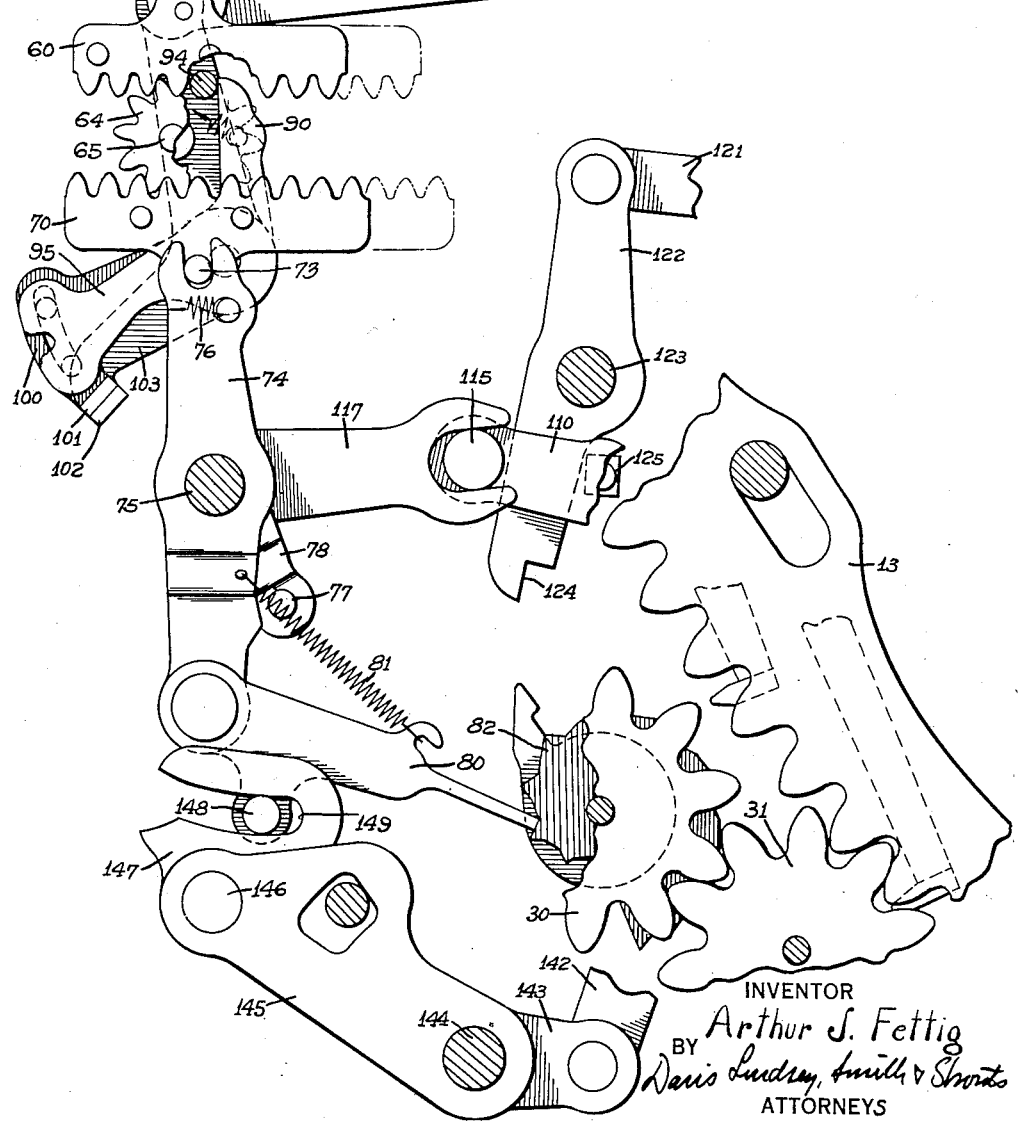
Fig. 6 is a view similar to Fig. 5 with the digit "2" in the register pinion but with the digit "8" indexed in the same order on the amount keys.

Finally, assume that the totalizer pinion 30 is in "2" position and that the "9" key is depressed. The lower rack 70 moves forward 9—2 or 7 steps beyond the minimum distance. The upper rack 60 moves 8 units of distance so that the two racks 60 and 70 together move a total distance of more than 9 steps over the minimum movement of the rack 70 and the control pinion 64 is moved forward beyond "neutral." The position of the parts under this condition is illustrated in Fig. 6.

It will thus be apparent that, whenever the digital value of the key depressed in any order exceeds the digital value represented by the position of the totalizer pinion 30 for that order, the control pinion 64 for that order will be moved forward beyond "neutral" position, whenever the value of the key depressed in any order is less than the value represented by the position of the totalizer pinion for that order, the control pinion 64 for that order remains rearward of its "neutral" position, and whenever the value of the key depressed in any order is the same as the value standing on the totalizer pinion for that order, the control pinion 64 for that order will be moved to its "neutral" position.

Such movements of the control pinions 64 may be utilized either to warn the operator or to effect a desired control of the machine prior to the entry into the totalizer of an amount which has been entered on the keys of the machine and which would, if entered into the totalizer, cause the total accumulated in the totalizer to reach a predetermined numerical condition. The type of total which is most frequently of interest is a negative total, and the utilization of the movements of the control pinions 64 to warn the operator or effect a desired control of the machine when the amount indexed on the keyboard would, if entered into the totalizer, cause the total therein to change from a positive total to a negative total, will be described first.

Bearing against the stud 65 upon which the control pinion 64 is mounted is one arm 90 of a bell crank lever pivoted on a stationary stud 91. This bell crank is urged against the stud 65 by a spring 92 connected to a stud 93 on the arm 90. The bell crank 90 is thus caused to follow the stud 65 which it does until the stud 65 passes more than one step beyond the "neutral" position of pinion 64 whereupon the bell crank limits against a stationary stud 94 carried by one of the partition plates. The other arm 95 of the bell crank 90—95 is provided with two studs 96 and 97 engaging in a slot 98 in an arm 100 pivoted on the stud 91. This arm has a laterally extending lug 101 which overlies a similar lug on a similar lever in the bank of next highest order and underlies a similar lug on an arm in the bank of next lowest order, as shown, for example, in Fig. 7. The lug 101 in the bank of highest order overlies a lug 102 on a lever 103 pivoted at 104 for controlling a predetermined portion of the machine to be presently described. It will be sufficient for present purposes to understand that, when the lever 103 is rocked counter-clockwise (Fig. 2), the desired control is exercised.

Figure 7:
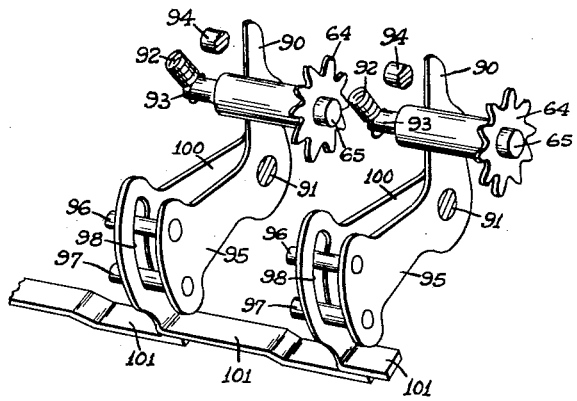
Figs. 7, 8, 9 and 10 are detail perspectives of certain control elements of the invention, the parts being shown in different positions, as will be later explained.

The parts as shown in Fig. 2 are in their normal positions. The parts are so proportioned that, as the highest order pinion 64 moves forwardly, the lug 101 on the highest order arm 100 will contact the lug 102 while the stud 96 remains in the top of the slot 98 when the sum of the movements of the two racks 60 and 70 reaches 8 steps over the minimum movement of the rack 70, as is the case whenever the value of the depressed key for that order is "1" less than the value standing on the totalizer pinion 30 for that order. If, however, either moves a further step forwardly, as is the case whenever the value of the depressed key is the same as the value standing on the totalizer pinion 30, and the pinion 64, therefore, moves forwardly to its "neutral" position, such further movement of the pinion 64 and arm 95 will not move the arm 100 and its lug 101 which rests on the lug 102, but will merely move the studs 96 and 97 downwardly in the slot 98 in the arm 100 to position the stud 97 at the bottom of the slot 98. If, likewise, the pinion 64 for the next-to-the-highest order of the machine moves forwardly to its "neutral" position, the lug 101 on the arm 100 for the latter order will come to rest upon the right-hand end of the lug 101 of the arm 100 for the highest order, and the studs 96 and 97 for the next-to-the-highest order will move downwardly into the slot 98 of the arm 100 for the latter order until the stud 97 is positioned in the bottom of the slot 98. This condition will obtain in all consecutive numerical orders from the highest order of the machine to the highest order in which the operator depresses a key of a value different from the value standing on the totalizer pinion 30 for that order. Fig. 7 illustrates this condition for two orders wherein either the value of the amount key depressed is the same as the value previously accumulated on the totalizer pinion 30 or the totalizer pinion stands at "0" and no amount key is depressed, the conditions in any higher orders being not different.

The algebraic sign of the total in the totalizer may be caused to change from positive to negative when, and only when, the machine is conditioned for subtraction and the amount entered on the keys is greater than the positive total previously accumulated in the totalizer. In every such case, in the highest order in which there is, in the amount entered on the keys, a digit differing from the digit in the corresponding order of the total previously accumulated in the totalizer, the digit in such order of the amount entered on the keys will be greater than the digit in the same order of the total previously accumulated in the totalizer. Therefore, in every case in which the amount entered on the keys could, if it were to be subtracted from the totalizer, cause the total in the latter to change from positive to negative, the highest order control pinion 64 which does not stand in its "neutral" position after the amount has been entered on the keys and the sensing feelers 80 have moved into engagement with the cams 82, will be forward of its "neutral" position and the lower order control pinions 64 may be positioned variously in or forwardly or rearwardly of their "neutral" positions. As the highest order control pinion 64 which is not in "neutral" position is then forwardly of its "neutral" position, it will permit the spring 92 to rock the arm 95 for that order below its "neutral" position, as shown for the lower or right-hand one of the two orders illustrated in Fig. 8. The stud 97 on that arm 95 therefore depresses the corresponding arm 100 and its lug 101 also below their "neutral" positions. If this happens in the highest order of the machine, the so depressed lug 101 will directly depress the lug 102; otherwise, the so depressed lug 101 will depress the lugs 101 in all higher orders where the control pinions 64 and arms 95 are in their "neutral" positions, to and including the lug 101 for the highest order of the machine, and so indirectly depress the lug 102.

Figure 9:
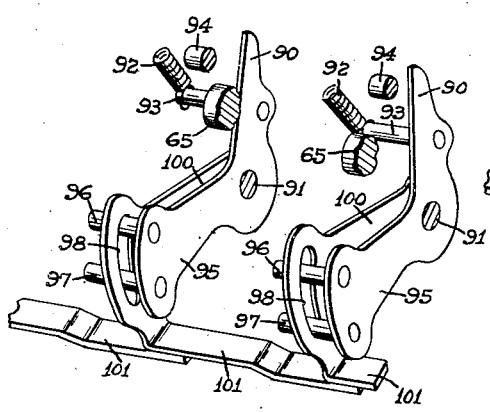
Figure 10:
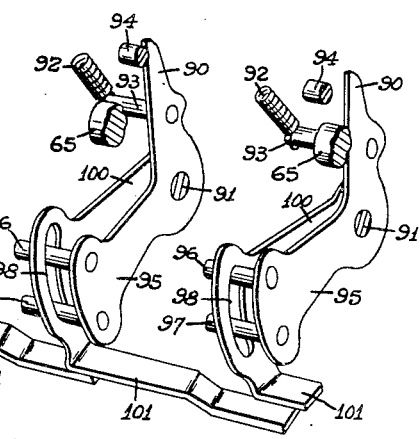

Although the control pinions 64 in one or more lower orders may be rearwardly of their "neutral" positions, they will not affect the control of the lug 102, inasmuch as such a control pinion rearwardly of its "neutral" position would merely hold its arms 95 and 100 and lug 101 elevated, as in the lower or right-hand one of the two orders illustrated in Fig. 10, without interfering with the depression of any lug 101 in any higher order, though it would, as shown in Fig. 9, hold in an elevated position any lower order lugs 101 and arms 100, even though the control pinions in such lower orders might, as in the case of the lower or right-hand one of the two orders illustrated in Fig. 9, be positioned forwardly of their "neutral" positions.

If no amount is entered on the keys while the total in the stabilizer is "0" the total will remain "0" when the machine is operated. If an amount entered on the keys is equal to a positive total standing in the totalizer, the subtraction from the totalizer of the amount entered on the keys would cause the total to become "0." In either of these two cases, all of the control pinions 64 will be in their "neutral" positions after the sensing feelers 80 have engaged the cams 82. All of the arms 95, arms 100 and lugs 101 will, therefore, be in the positions illustrated in Fig. 7 and the lug 102 will not be depressed.

In any case in which there is a positive total in the totalizer and an amount smaller than such total is entered on the keys so that, even if such amount were subtracted from the totalizer, a positive balance would remain in the totalizer, the highest order control pinion not in its "neutral" position will be stopped short or rearwardly of its "neutral" position, though the control pinions in any lower orders may be variously positioned forwardly of, rearwardly of, or in their "neutral" positions. In that case, the highest order control pinion not in the "neutral" position being rearwardly of its "neutral" position will hold its arm 95 above its "neutral" position, as shown in the higher or left-hand one of the two orders illustrated in Fig. 9, so that the arm 100 and lug 101 for that order will prevent any lower order lugs 101, arms 100 and arms 95 from moving below "neutral" position. Likewise, the lug 101 for the highest order in which the arm 95 is held above "neutral" position will not be permitted to depress the lug 102 directly if it is the highest order lug 101 of the machine or in any other case will not be permitted to depress the higher order lugs 101 below "neutral" position so as indirectly to depress the lug 102.

Thus, it will be seen that the construction thus far described is such as to cause depression of the lug 102 only when the amount entered on the keys is such that, if it is subtracted from the totalizer, it would cause the sign of the total therein to become negative.

Figure 8:
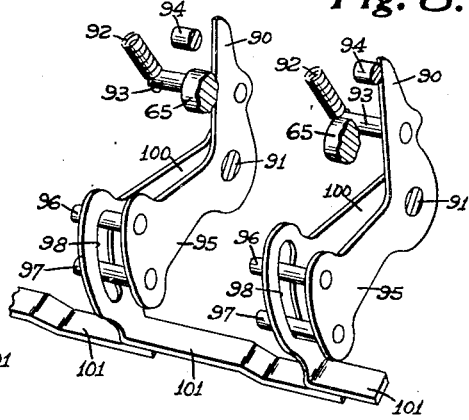

To couple the conditions illustrated in Figs. 7-10 with specific examples, it may be pointed out that the positions of the parts illustrated in Fig. 7 are such as the parts would assume while the sensing feelers 80 were engaged with the cams 82 while the amount ".20" (20 cents) entered on the amount keys and the positive total standing in the totalizer is also ".20" (20 cents). The positions of the parts shown in Fig. 8 are those which they would assume if ".08" (8 cents) is entered on the keyboard while the register contains a positive total of ".02" (2 cents). The positions of the parts of Fig. 9 are those which they would assume if ".48" (48 cents) is entered on the amount keys and the totalizer contains a positive total of ".52" (52 cents). The positions of the parts in Fig. 10 are the positions which they would assume if ".72" (72 cents) is entered on the amount keys while the totalizer contains a positive total of ".42" (42 cents).

*Automatic control of predicting means*

Figure 3:
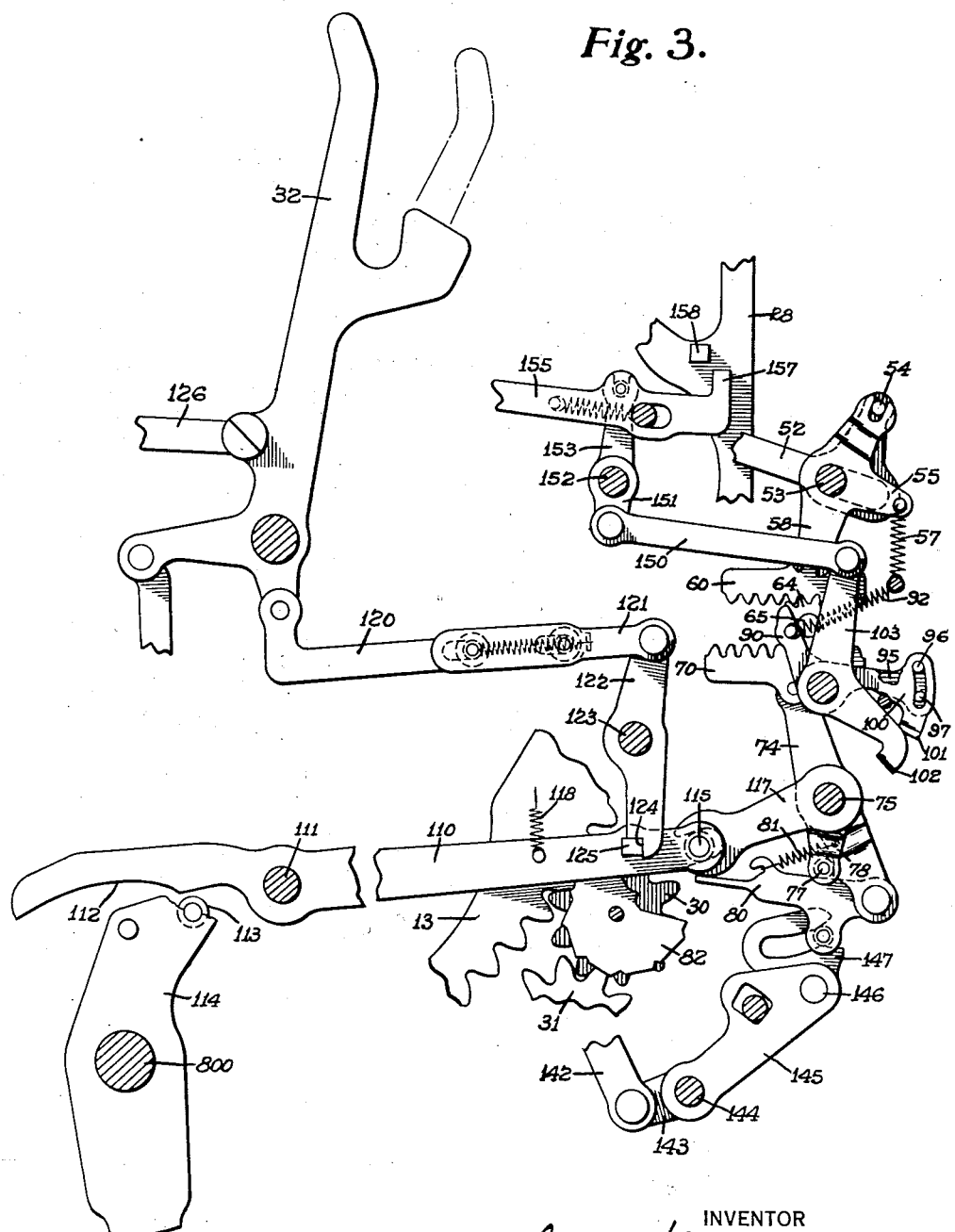
Fig. 3 is a partial left side elevation of some of the parts more particularly concerned with the invention, especially the control by means of the subtract lever.

As previously explained, the totalizer pinions are rotated during a machine cycle in item entering operation. Since the sensing members 80 are adapted to engage surfaces on cams fixed to the register pinions and since these surfaces are of varying depth, it would not be desirable to have the sensing devices engage the cams while the pinions are being rotated. In order to take care of this condition, means is provided for holding the sensing members 80 in inactive position during the machine cycle. Referring to Fig. 3, a lever 110 is pivoted on a stud 111 and provided with a cam surface 112 adapted to be engaged by a cam roller 113 on a lever 114 attached to the 800 shaft which is rocked counterclockwise and then returned clockwise during each cycle of machine operation. The forward end of the lever 110 carries a stud 115 operating in a slot in the end of an arm 117 fixed to the shaft 75. This shaft carries the arms 78 having the studs 77 against which the levers 74 carrying the sensing members 80 limit. When the lever 110 is rocked clockwise in Fig. 3, it rocks the shaft 75 counterclockwise in said figure, or clockwise in Fig. 2, which moves the feeling members 80 out of active position. The lever 110 is urged counterclockwise (Fig. 3) by a spring 118. At the beginning of each cycle, the roller 113 engages the cam surface 112 and rocks the lever 110 clockwise, the cam surface 112 being so shaped as to hold said lever in its clockwise position during most of the cycle but releasing it near the end of the cycle so that the sensing levers are held inactive for most of the cycle but are freed to move to sensing position after the register pinions are in their new positions. The sensing levers or members 80 are thus moved to inactive position at the very beginning of the cycle, are held in this position during most of the cycle, and are then released at the end of the cycle to sense the new condition of the totalizer and move their racks to positions to be ready to cooperate in the control of the control pinions when the next item is indexed on the amount keys. Thus, as soon as the next item is indexed, the special control of the machine is exercised.

If the predicting means is to be used to predict the possibility of the sign of the total in the totalizer changing from positive to negative, it should not be active when the machine is conditioned to add in the totalizer the items entered on the keys.

The subtract lever 32 (Fig. 3) has a link 120 connected to its lower end which link is yieldingly connected to a second link 121 pivoted to the end of a latch lever 122 pivoted at 123. The lower end of this latch has a shoulder 124 adapted to engage a square stud 125 on the lever 110. As long as the subtract lever is in the add position, which is the full line position of Fig. 3, the latch 122 engages stud 125 and prevents lever 110 from moving counterclockwise under the urge of its spring 118 when said lever is released by the cam roller 113 at the end of a machine cycle. Consequently, as long as the subtract lever is in add position, the sensing members 80 will be held out of active position by arm 117 and studs 77, and the predicting means is inactive. However, when the subtract lever is moved to subtract position, which is the dot-dash position of Fig. 3, the latch 122 is rocked counterclockwise out of the path of the stud 125. This releases the lever 110 which thereupon moves counterclockwise to release the sensing members 80. The predicting means becomes active immediately and before the motor bar is depressed.

The control just described is manual in the sense that the subtract lever is manually positioned, but an automatic control is also provided. Connected to the subtract lever 32 is a link 126 which is controlled by the paper carriage as described in Pasinski Patent No. 1,778,506. When the paper carriage is moved to a predetermined column, which occurs at the end of the cycle preceding the subtract cycle, the subtract lever is moved into subtract position and the predicting means is rendered active so as to function as soon as an item is indexed. Thus the predicting means is automatically controlled in accordance with the column in which printing occurs. When the machine is used for bank work, this automatic control is ordinarily provided in the "check" column, which is the column where items are subtracted from a customer's account.

Figure 5:
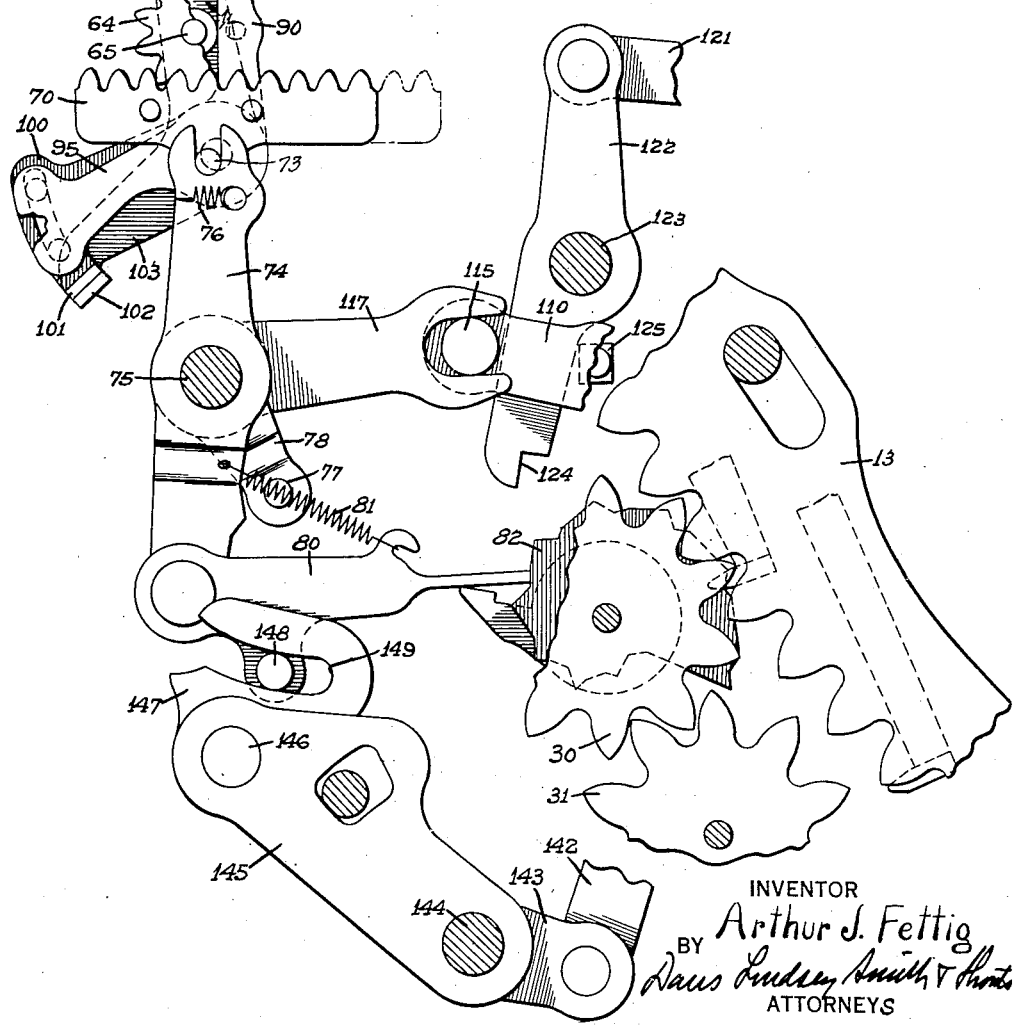
Fig. 5 is an enlarged partial right side elevation showing some of the parts of the invention in the position they occupy when the digit "4" has been indexed by a key and when the same digit is in the register pinion of the same order.

Another condition that must be taken care of is this:

The sensing members 80 are arranged to sense the cams 82 on the add pinions 30, and when the totalizer is in add position said members act to do this as illustrated in Fig. 5. But when the totalizer is tumbled to subtract position, the add pinions move to a different position, which means that the sensing members must be capable of sensing the cams 82 with the totalizer in subtract position.

Figure 4:
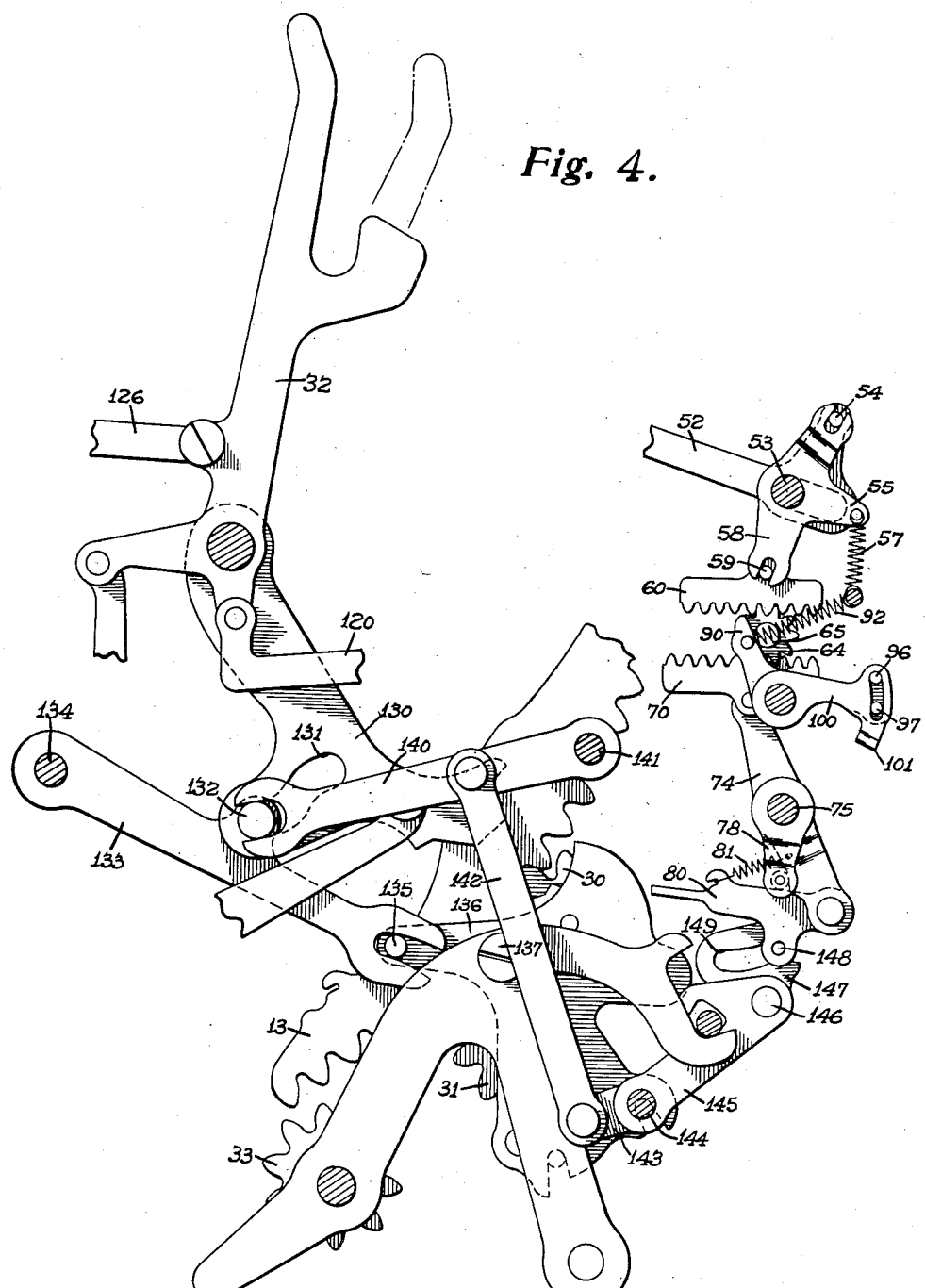
Fig. 4 is a view similar to Fig. 3, showing the parts in a different position.

Referring to Fig. 4, when the subtract lever 32 is moved to the dot-dash, or subtract, position and the machine operated, an arm 130 is moved clockwise from its Fig. 4 position. This arm has a cam slot 131 operating on a stud 132 on an arm 133 pivoted at 134. The free end of this arm has a bifurcated end straddling a stud 135 on one of the side plates 136 of the tumbling frame carrying the totalizer pinions, this frame being pivoted to rock about the axis 137. Positioned astride the stud 132 is one end of an arm 140 pivoted at 141. This arm is connected by a link 142 to one end of a crank 143, fixed to a shaft 144. Also fixed to this shaft is a side arm 145 carrying a bail 146 that extends across the machine where it is connected to another arm similar to the arm 145. The bail, or shaft, 146 carries a series of cam members 147 of which there is one for each of the sensing members 80, each of said sensing members having a stud 148 operating in a cam slot 149 in its cam member 147.

When the subtract lever 32 is in the full line add position of Fig. 4, the various arms, links and cam members occupy the position shown in Fig. 4 and also in Fig. 5, where the sensing members 80 are in position to sense the cams 82 on the add pinions, with said pinions in add position. But, when the subtract lever 32 is moved to the dot-dash position of Fig. 4, and the machine operated, the movement of arm 130 moves the arm 140 clockwise, which rocks the arms 143 and 145 in the same direction, thereby moving the cams 147 from the position in Fig. 5 to that of Fig. 6. This moves the feeling members 80 downwardly to a position such that they will sense the cams 82 on the add pinions 30 when said pinions are in the position they occupy when the totalizer is in subtract position. Thus, the sensing members 80 are automatically controlled so as to act on the cams 82 of the add pinions in both the add and the subtract position of the totalizer.

*Devices governed by predicting means*

As explained up to this point, the predicting means controls the movement of a lever 103 shown at the left hand side of Fig. 2. This lever may be employed to govern different parts of the machine, or to operate different types of signals, some of which devices will now be explained.

The upper end of lever 103 (Fig. 2) is connected by a link 150 to a crank 151, fixed to a shaft 152 that extends across the machine. The other end of this shaft has a crank 153 fixed to it, which engages a stud 154 on a slide 155 which, in the embodiment shown in Figs. 1 and 2, is a locking slide for the motor keys 28 and 29. The slide 155 is urged to the left, as viewed in Figs. 1 and 2, by a spring 156, to keep the left hand upturned end 157 of the slide out of the path of a square stud 158 on the stem of the key 28. The right hand upturned end 160 (Fig. 1) of slide 155 is then positioned under a stud 161 in the stem of key 29. Spring 156 keeps the parts 153, 152, 151—102 in the position shown in Fig. 2.

When the parts occupy the positions shown in Fig. 1, the key 28 is free to be depressed but the key 29 is blocked against depression. The key 28 is the one that is depressed to set the machine into operation.

When, with a positive or "0" total in the totalizer, an amount entered on the amount keys is such that, if it were subtracted from the sign of the total, the totalizer would become negative, the predicting means operates as heretofore explained to move lever 103, with the result that the slide 155 is moved to the right (Figs. 1 and 2), thereby blocking the key 28 and releasing the key 29. Since the key 28 is the one that the operator depresses after indexing an item, he finds, when he attempts to depress it, that said key will not move. This notifies him that, if the item is entered in the totalizer, it will cause the total in the totalizer to become negative. This notification comes before he actually operates the machine to enter the item.

In most cases after finding the key 28 blocked the operator will depress the error key E to release the depressed amount keys, and will not continue with the posting of that particular customer's account. If, however, he wishes to enter the item for some reason, he may still do so by depressing the motor key 29 which is now released. This will give the machine a cycle of operation. Or he may do the same thing by depressing the main motor bar 21. If he does either, the sign of the total in the totalizer becomes negative, and he may then take the negative total in the usual manner by giving the machine the necessary number of cycles and by depressing the total key 46.

Figure 11:
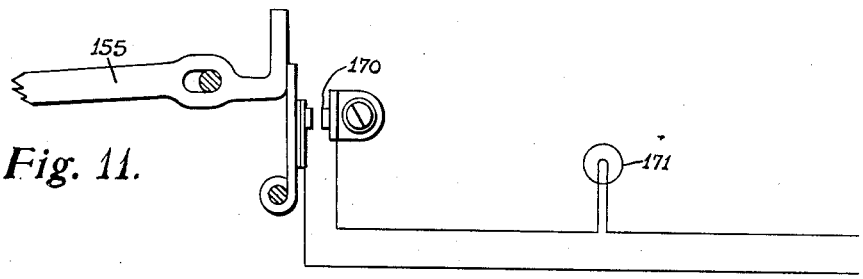
Figs. 11, 12, 13 and 14 are diagrammatic views showing some of the different forms of control that may be used in connection with the invention.

Fig. 11 shows a modification in which the slide 155 controls an electric switch 170 in the circuit of an electric light 171. When the slide 155 is moved to the right at the time an item is entered that would, if it went into the totalizer, cause the totalizer to go negative, the switch 170 is closed to light the light and give the operator a visible signal. The signal may be controlled at the same time the motor key 28 is blocked, as above explained, or the signal may be used alone.

Figure 12:
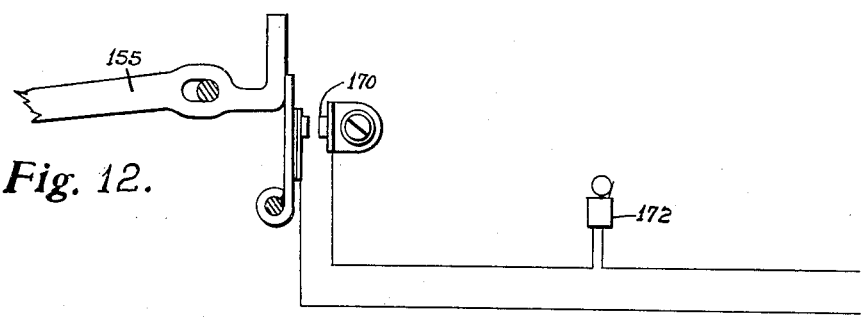

Fig. 12 shows a modification similar to Fig. 11, except that the switch 170 controls an electric bell 172 to give an audible signal, which may be used either with or without the control of the motor key 28.

Figure 13:
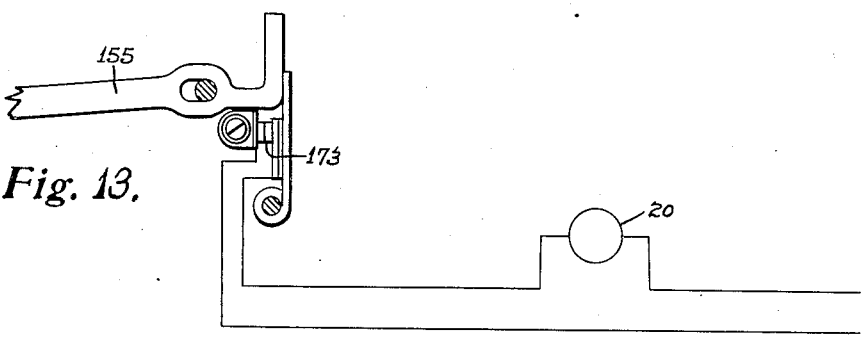

Fig. 13 shows another modification in which a switch 173 is normally closed, said switch being in the circuit of the motor 20 that operates the machine. When an item is entered, which, if it went into the totalizer, would cause the sign of the total in the totalizer to become negative, the switch 173 is opened so that the motor cannot be operated to give the machine a cycle of operation. In this modification, the amount keys are released by means of the error key E so that the predicting mechanism will go back to normal in order that the motor circuit may be closed again.

Figure 14:
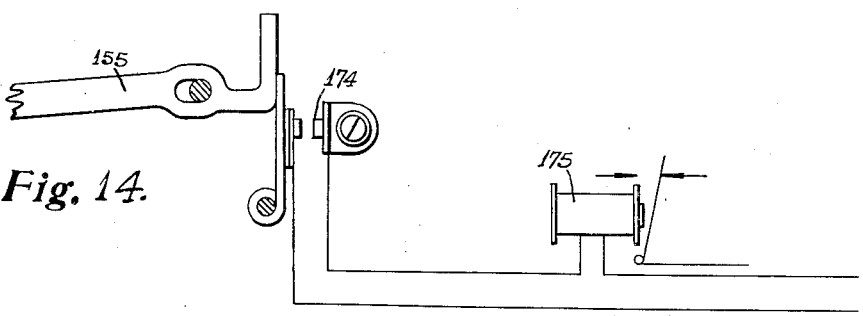

Fig. 14 shows still another modification, in which an electric switch 174 controls a relay 175 which may control any one of a variety of parts of the calculating machine, or it may operate a signal, which can be at a distance. In this form, when the switch 174 is closed, the relay 175 operates to control the part of the machine governed by it or to operate a signal.

*Automatic control of printing mechanism*

Figure 17:
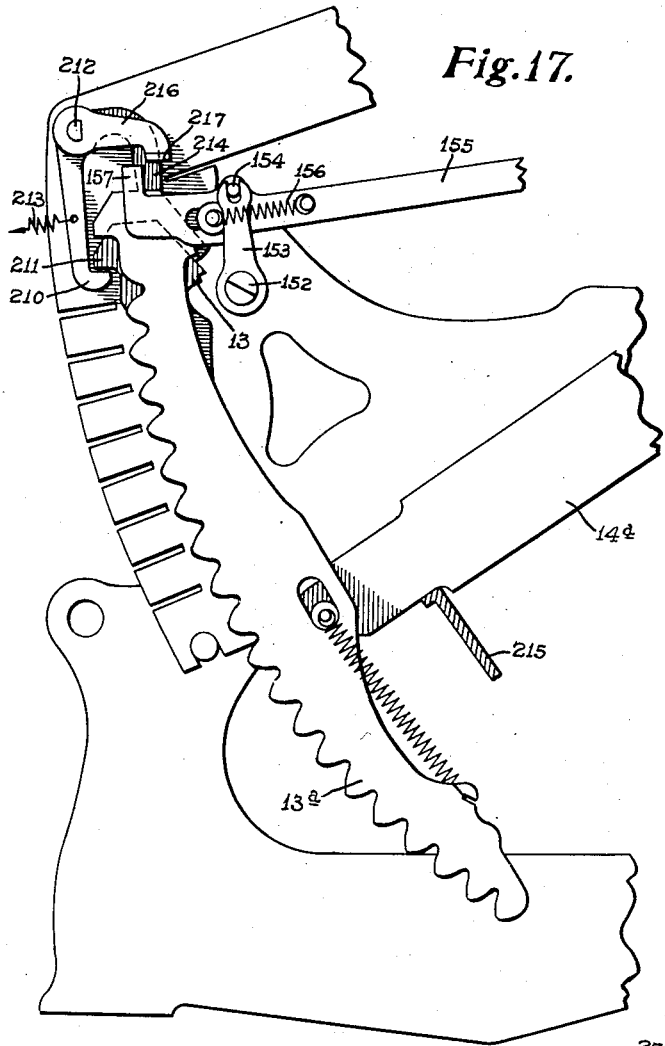
Fig. 17 is a partial right-side sectional elevation of the non-add, non-print feature.

Instead of blocking a motor bar or otherwise signalling the operator that an indexed item would, if entered in the totalizer, cause the balance in said totalizer to reach an undesired condition, the machine may be allowed to operate but the printing mechanism controlled so that the item will not be printed. The totalizer may also be non-added so that the item will not be entered in the totalizer. This form of control is shown in Fig. 17.

Each of the actuators 13 is provided with a hook 210 having a nose adapted to engage under a shoulder 211 on the upper end of its actuator. These hooks are fixed to a shaft 212 pivoted at the forward part of the machine, said shaft being urged counterclockwise by a spring 213 to urge the hooks away from latching position. An extra rack 13ᵃ is provided on the right hand side of the machine as viewed from the front, said rack not being connected with the totalizer or the tens-transfer mechanism but merely being an idle rack mounted on an extra lever 14ᵃ. When the machine is in normal condition the extra rack 13ᵃ occupies the position of Fig. 17 where its upper end abuts against the end of an arm 214 fixed to the shaft 212, said rack 13ᵃ thereby holding the hooks 210 in latching position against the tension of spring 213. As the machine starts to operate the bail 215 moves downwardly, thereby releasing the actuator racks whereupon the extra actuator rack 13ᵃ moves away from arm 214 and frees shaft 212 for movement under the urge of spring 213. The hooks are then moved to released position to permit all the actuator racks to descend.

Fixed to shaft 212 is another arm 216 having a lateral lug 217. The upturned end 157 of the control slide 155 is normally positioned as shown in Fig. 17 where it is out of the path of lug 217. But, if an item indexed on the keys would, if entered in the totalizer, cause the totalizer to go to an undesired condition, the slide 155 moves to the right (Fig. 17), which positions its upturned end 157 under the lug 217 on the arm 216. Under these conditions, when the machine starts to operate, the shaft 212 cannot rotate clockwise and hence all the actuators are prevented from moving. This prevents operation of the printing mechanism because, in the Burroughs machine, said printing mechanism does not operate unless some of the actuators move. It also results in non-adding the machine in the sense that, even though the totalizer is rocked into engagement with the actuators, no movement of the totalizer pinions will occur because the actuators do not move.

All the motor bars may be arranged to be free for depression and the machine may always be operated by any of said bars, but the item will not be entered in the totalizer and said item will not be printed. This form of the invention is particularly useful where the machine operates automatically through a series of cycles that would make it somewhat difficult to stop the cycling of the machine immediately. A cycle may occur after an undesired item has been indexed but said item will not be entered or printed.

*Automatic control of front-feed throat*

It is sometimes desirable, when an item is indexed which, if entered in the totalizer, would cause the balance in said totalizer to reach an undesired condition, to not only not enter said item in the machine but to also remove the work sheet on which operations are being performed. Provision has been made for opening a front-feed throat automatically so that the operator can immediately remove the sheet without manipulating any part of the machine.

Figure 19:
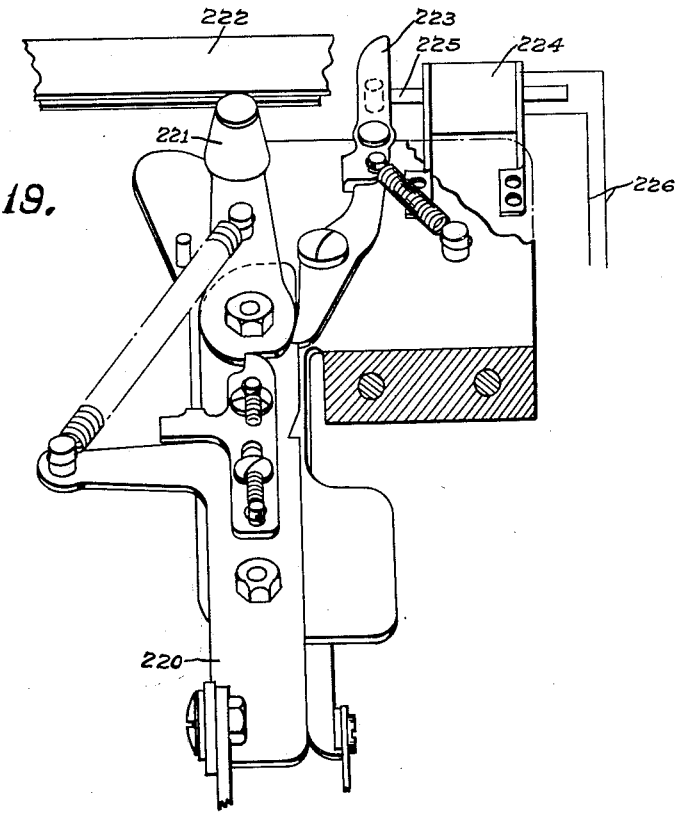
Fig. 19 is a partial front elevation showing the front-feed throat operating mechanism.

The platen mounting and the front-feed throat construction may take the form disclosed in German Patent No. 647,638, the same being illustrated in a general way in Fig. 1 with some of the details shown in Fig. 19. The platen normally occupies the position shown in Fig. 1 but may be thrown back to a front-feed position and the front-feed throat automatically opens to permit removal of the work sheet. The throat is opened by power slide 220 (Fig. 19), the upper end of said slide having a roller stud 221 engaging a bail 222 which, when moved upwardly, throws the platen back and automatically opens the front-feed throat. The slide 220 is held against movement by a latch 223 engaging a notch in said slide. As shown in said British patent this latch may be controlled by a key on the keyboard or automatically by the paper carriage.

An additional control is provided in this case in the form of an electromagnet 224 having a solenoid plunger 225 positioned so that it may engage the upper end of the latch 223 to release it. The circuit 226 of this solenoid is controlled by a switch 170 shown in Fig. 11.

With this form of the invention, when an item is indexed on the amount keys that would, if entered in the totalizer, cause the totalizer to go to an undesired condition, the member 155 (Fig. 11) closes the switch 170 thereby energizing the electromagnet 224 (Fig. 19). The plunger 225 hits the latch 223 thereby releasing the slide 220 which automatically moves upward to open the front-feed throat. Thus, without any attention on the part of the operator, the mere indexing of the above-mentioned type of item on the keys will cause the front-feed throat to automatically open.

The opening of this throat may be used as a signal to the operator and no other control need be employed although it will be understood that the motor bar could also be blocked and a visible or audible signal could also be given by simply using the devices heretofore described in connection with the control of the front-feed throat.

*Automatic control of totalizer selection*

As previously mentioned, even though an item indexed on the keys might, if entered in the totalizer, couse the balance in said totalizer to reach an undesired condition, nevertheless it may be desirable to enter said item and, in that event, it may be desired to have it entered in a special totalizer or register. Accordingly, provision is made for automatically selecting a register to receive such item.

The machine is provided with a plurality of totalizers or registers 33 (Fig. 1) which are constructed and arranged as described in Pasinski Patent No. 1,911,768. As described in said patent, these totalizers are normally selected automatically by the paper carriage though they could be selected manually. But the selection may be varied by movement of a member numbered 263—264 in Figs. 12 and 13 of said patent, a corresponding member 230 (Fig. 15) being provided in the present machine. In said patent this member is controlled by the subtract lever but the member is controlled in the present invention as follows:

The automatic mechanism controlled by the indexing of an item on the keyboard preferably blocks the motor bar 28 as heretofore described. The operator, if he so desires, may then depress the motor bar 29 (Fig. 1) to enter the item. The control slide 155 (Fig. 17) is provided on its right-hand end (Fig. 15) with a slide 231 having a limited vertical movement. When the control slide 155 is moved to the right, the vertical slide 231 moves under a stud 232 on the crank 233 to which the stem of the motor key 29 is connected. This does not lock said motor key but, when the key is depressed, the slide 231 moves downwardly. The lower end of the slide has a stud 234 engaging the end of one arm 235 of a bell crank lever pivoted at 236. The other arm 237 of this bell crank is connected to an arm 238 fixed to a shaft 239. This shaft has another arm 240 engaging a stud 241 on the member 230.

With this form of the invention, if an item is indexed on the amount keys which, if entered in the totalizer, would cause the balance in the totalizer to reach an undesired condition, the control member 155 moves to the right (Fig. 15). This blocks the motor bar 28 and moves the vertical slide 231 under the stud 232. The operator may then depress the motor bar 29 which rocks the bell crank 235—237 counterclockwise which results in moving the arms 238 and 240 clockwise. This rocks the member 230 counterclockwise and causes a register to be selected different than the one normally selected, in the same manner as when said member is moved by the subtract lever in said Pasinski Patent No. 1,911,768.

Thus, without any attention on the part of the operator, if an item indexed on the amount keys would, if entered in the totalizer, cause the balance in said totalizer to reach an undesired condition, a special register is selected so that, in the event the operator nevertheless operates the machine, the indexed item will go into a special register.

*Automatic control of columnar printing*

It is sometimes desirable to control columnar printing in response to the nature of the item indexed on the amount key. For example, it may be desired to prevent a change in the columnar printing or it may be desired to print the item in a special column.

Columnar printing is controlled by governing the movement of the paper carriage. This is accomplished by a tabulating mechanism which is described in Müller Patent No. 1,942,216. Briefly, it includes a rock shaft 250 (Fig. 15) carrying one or more adjustable tab stops 251. When the carriage is at rest the tab stop 251 that is in active position engages an abutment 252 (Fig. 16) which holds the carriage against movement. The machine has a slide 253 (Fig. 16) which is moved upwardly and then returned downwardly during each machine cycle, the upward movement occurring during the latter part of the cycle. Pivoted on this slide is a tabulating pawl 254 whose upper end is adapted to engage under the tab stop 251. As the slide 253 is moved upwardly, the pawl 254, engaging the tab stop 251, rocks the shaft 250 so as to move the tab stop above the abutment 252, whereupon the pawl automatically releases the stop and the shaft 250 returns to normal so that the next tab stop will be in position to engage the abutment 252 to arrest the carriage in its next columnar position.

For the purpose of disabling the tabulating mechanism, the shaft 239 (Fig. 15) is provided with an arm 260 connected by a link 261 to a bell crank 262 pivoted at 263. The upper arm of this bell crank is adapted to engage a stud 264 on the tabulating pawl 254. If the arm 260 is rocked clockwise in Fig. 15, bell crank 262 will be rocked clockwise in Fig. 16 to move the tab pawl 254 clockwise so that its upper end will not engage the tab stop 251 when slide 253 moves upwardly. Consequently, when the slide 253 moves upwardly, the tap stop 251 and rock shaft 250 will not be moved and the carriage will remain in the position it occupies.

This form of the invention is preferably used together with the blocking of the motor bar 28. Assume, for example, that an item is indexed on the keys which, if entered in the totalizer, would cause the balance in said totalizer to reach an undesired condition. The motor bar 28 is blocked against operation, but the operator can, if he so desires, press the motor bar 29. At the time the item was indexed the control slide 155 moved to the right in Fig. 15 so as to position the vertical slide 231 under the stud 232 on the crank 233 associated with motor bar 29. Accordingly, when said motor bar 29 is depressed, the bell crank 235—237 will be rocked counterclockwise which will rock the shaft 239 clockwise. This rocks the arm 260 clockwise and moves the tab pawl 254 to disabled position as just described.

Thus the operator can enter the item and cause it to be printed without a change in the columnar position of the carriage occurring at the end of the cycle.

The disablement of the printing mechanism and the non-adding of the machine may be also had at the same time by using the modification illustrated in Fig. 17. If used, and if the machine should go through a cycle of operation automatically, the indexed item would not be entered in the totalizer, would not be printed, and the carriage would not tabulate.

Figure 18:
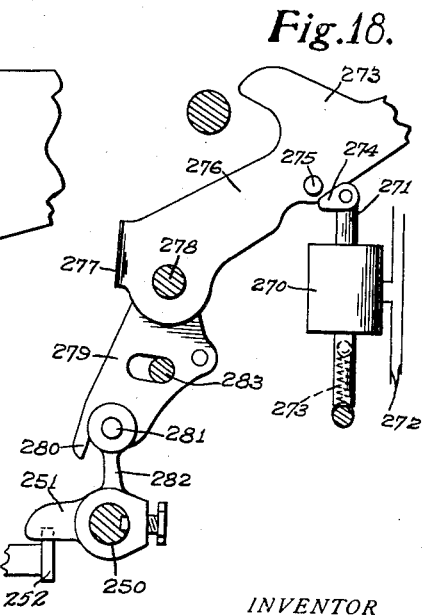
Fig. 18 is a detail view of the tabulating control feature.

It may also be desired, in the event an item is indexed which, if entered in said totalizer, would cause the balance in the totalizer to reach an undesired condition, to have the paper carriage tabulate automatically to a new column in order that, if printing of the item is desired, the item may be printed in a special column. To accomplish this, a construction such as shown in Fig. 18 is employed. An electromagnet 270 is mounted on the stationary part of the machine, said electromagnet having a plunger 271, and a circuit 272 controlled by a switch such as the switch 170 shown in Fig. 11. The plunger 271 is urged downwardly, as viewed in Fig. 18, by a spring 273. Its upper end carries a pass-by pawl 274 positioned for engagement with a stud 275 on the arm 276 of a yoke 277 pivoted on a shaft 278. This yoke has another arm 279 extending downwardly where its end 280 is positioned to engage a ball 281 carried by arms 282, one of which is shown in Fig. 18, connected to the rock shaft 250 carrying the tab stops 251. This shaft, as previously explained, may be rocked clockwise (Fig. 18), to release the carriage, said shaft being urged to the position illustrated in Fig. 18.

With this construction, when an item is indexed on the keys which, if entered in the totalizer, would cause the balance in the totalizer to reach an undesired numerical condition, the control slide 155 (Fig. 1) is moved to close the switch 170 (Fig. 11) to energize the electromagnet 270, whereupon the plunger 271 moves upwardly. The pass-by pawl 274 engages the stud 275 and rocks the yoke 277 counterclockwise, which rocks the shaft 250 clockwise to release the tab stop from its abutment. The carriage then moves toward its next columnar position. As soon as the pass-by pawl 274 passes the stud 275, the yoke 277 is released, which allows the tab shaft 250 to return to normal, which it does in time to arrest the carriage in its next columnar position. The movement of yoke 277 is limited by a stud 283.

Thus, upon the indexing of an item such as just explained, the carriage automatically moves to a predetermined position to enable the item to be printed in a special column.

This form of the invention is preferably used with the blocking of the motor bar 28 to thereby prevent a cycle of operation of the machine being started in the event the operator attempts to depress the motor bar 28 before the carriage has reached its new position. Finding the bar 28 locked, he can then depress bar 29 but, in the meantime, the carriage will have moved to its new position. He can then enter the item if he so desires and said item will be printed in a special column.

Automatic control of carriage return

Figure 20:
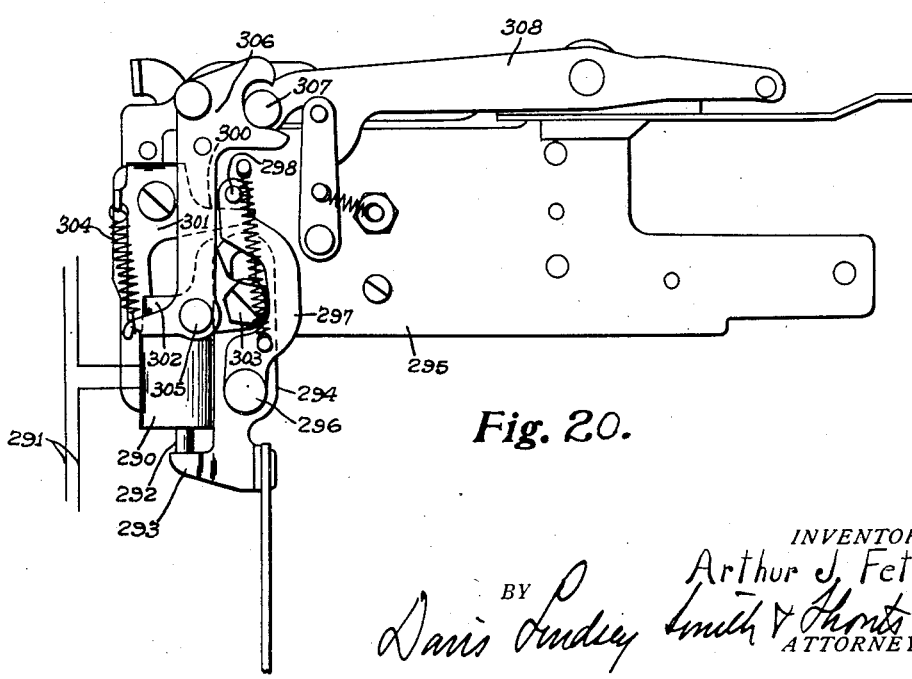
Figure 20 is a partial front elevation showing the carriage return feature.

It may also be desired, in the event an item is indexed, which, if entered in the totalizer, would cause the balance in the totalizer to reach an undesired numerical condition, to have the carriage automatically return to a predetermined position. Provision is made for this automatic operation by mechanism which is illustrated in Fig. 20.

A solenoid 290 is provided having a circuit 291 controlled by the switch 170 shown in Fig. 11. This solenoid has a plunger 292 which is normally held in an upper position but which, when the electromagnet is energized, moves downwardly. When the plunger moves downwardly, it engages a projection 293 on a slide 294 mounted on the back plates 295. Pivoted at 296 on said slide is a lever 297 having a stud 298 positioned over an arm 300 of a latch 301. When the slide 294 is moved downwardly, the latch 301 is moved clockwise, thereby releasing the lever 302 pivoted at 303 and urged clockwise (Fig. 20) by a spring 304. Pivoted on lever 302 at 305 is a member 306 having a bifurcated end straddling a stud 307 on the clutch control lever 308 of the carriage return mechanism. When lever 302 is released, its clockwise movement under the urge of spring 304 moves member 306 upwardly, which rocks lever 308 clockwise to set the carriage return mechanism into operation. The details of this carriage return mechanism are disclosed in Muller Patent No. 1,580,534.

When an item such as above mentioned is indexed on the keys, the slide 155 (Fig. 1) moves as heretofore explained to close the switch 170 (Fig. 11). This energizes the electromagnet 290 which thereupon trips the carriage return mechanism so as to cause the carriage to automatically return across the machine to a predetermined position which is usually its starting or "home" position. Consequently, as soon as the operator indexes the item, he is informed by the return of the carriage that it is not the type of item it is desired to have entered in the totalizer; and, while this notification is being given, the carriage moves automatically back to its starting position where he can start operations again.

The automatic opening of the front-feed throat can be used in combination with the carriage return so that, when the carriage reaches its returned position, the throat will be automatically open. The operator can then remove the sheet and insert another without having to manipulate any part of the machine.

Combinations of automatic control

While the various forms of control have been illustrated and described separately, two or more of them may be used together if desired.

An audible or a visible signal, or the blocking of the motor bar 28, or the opening of the front-feed throat can be used alone for signalling purposes, or two or more of these controls can be used together.

The control of the printing mechanism and the non-adding of the machine may be employed alone, or in combination with a visible or audible signal, or with the automatic opening of the front-feed throat.

A useful combination is to employ the non-add, non-print, and non-tabulation of the carriage together with some kind of signal, preferably an audible signal. When the operator indexes an item that would, if entered in the totalizer, cause the balance in the totalizer to reach an undesired numerical condition, a signal is given; but the motor bar is not locked. If the operator is so rapid that he depresses the motor bar at about the same time the signal is given, nevertheless, the item will not be added or printed; nor will the carriage move. The operation of the machine will simply release the amount keys at the end of the machine cycle. In effect, what has happened is that the normal functions of the machine have been disabled so that the machine cycle is a blank cycle. This control can occur no matter whether the item is to be added or subtracted. The operator can proceed in whatever manner he desires because the machine is back in the same condition as when he started the operation.

The disablement of the carriage tabulating mechanism, or the special control of it, may be used alone or in combination with a visible or audible signal, or with the opening of the front-feed throat.

Automatic selection of a register to receive the indexed item may be used in connection with any form of signal and in combination with the control of the tabulating mechanism and in combination with the control of the front-feed throat.

The automatic control exercised is not only the automatic control of a signal, but the automatic control of predetermined functions of a machine, such as the control of the front-feed throat, the control of register selection, the control of columnar printing, the control of the printing mechanism, the control of non-adding for the totalizer, these function controls being shown by way of example.

It is to be understood that the invention is easily adaptable to effect a desired control of the machine or warning of the operator or both when the amount entered on the keyboard would, if entered into the totalizer, cause the balance therein to pass in either direction through predetermined values which may be other than "0," and that the construction shown is for purposes of illustration and that variations may be made in it without departing from the spirit and scope of the invention as defined by the appended claims.

I claim:

1. A calculating machine of the classs described comprising means for giving it cycles of operation, a registering mechanism, amount indexing means, means for entering in said registering mechanism, in a machine cycle, an amount indexed in said indexing means prior to said machine cycle, mechanism for performing a predetermined function in said machine cycle, and means governed by said indexing means and by said registering mechanism in accordance with its numerical condition upon the indexing of an item in said indexing means and acting automatically, if said item is such that it would, if it were to be entered in said registering mechanism, cause a predetermined numerical condition therein, to alter the condition of said function performing mechanism during the machine cycle following the indexing of such item in said indexing means.

2. A calculating machine of the classs described comprising means for giving it cycles of operation, a registering mechanism, amount indexing means, means for entering in said registering mechanism, in a machine cycle, an item indexed in said indexing means prior to said machine cycle, printing means normally operated during the machine cycle, to print said indexed item, means governed by said indexing means, by said registering mechanism in accordance with its numerical condition upon the indexing of said item in said indexing means, and means conditioned by said governed means upon the indexing of an item such that, if entered in said registering mechanism, it would cause a predetermined numerical condition therein, to prevent printing of said indexed item by said printing means.

3. A calculating machine of the class described comprising means for giving it cycles of operation, a printing means, columnar-printing control means for controlling the column in which printing occurs on record material supported on said machine, amount indexing means, normally ineffective means for conditioning said columnar printing control means in a predetermined manner, registering mechanism, means for entering in said registering mechanism, in a machine cycle, an item indexed in said indexing means prior to said machine cycle, and means governed by said indexing means and by said registering mechanism in accordance with its numerical condition upon the indexing of an item in said indexing means, to enable said means for conditioning said columnar-printing control means when said item is such that, if entered in said registering mechanism, it would cause a predetermined numerical condition therein.

4. A calculating machine of the class described comprising means for giving it cycles of operation, registering mechanism, amount indexing means, front-feed means for receiving and holding a work sheet in front-fed position, said front-feed means being movable from a closed to an open-throat condition and vice versa, power means for moving said front-feed means to open-throat condition, means for entering in said registering mechanism, in a machine cycle, an item indexed in said indexing means prior to said machine cycle, and means governed by said indexing means and by said registering mechanism in accordance with its numerical condition upon the indexing of said item and acting, when said item is such that it would, if entered in said registering mechanism, cause an undesired numerical condition therein, to cause said power means to automatically move said front-feed means to open-throat condition.

5. A calculating machine of the class described comprising means for giving it cycles of operation, a main registering mechanism, totalizers, means for selecting said totalizers, means to control said totalizer selecting means, amount indexing means for indexing items, means for entering in said registering mechanism and in the selected totalizer, in a machine cycle, an item indexed in said indexing means prior to said machine cycle, and means governed by said indexing means and by said registering mechanism in accordance with its numerical condition upon the indexing of said item in said indexing means and acting, when said item is such that, if it were to be entered in said registering mechanism, it would cause a predetermined numerical condition therein, to condition said totalizer selecting means to select a special totalizer to receive said item in said machine cycle.

6. In a calculating machine having means to drive it through single cycle operations, amount indexing means indexable while said machine is at rest between two successive machine cycles, actuator means operable by said driving means and controlled by said indexing means in at least the second of said successive machine cycles, and a register operable by said actuator means in at least the second of said successive machine cycles to enter into said registering mechanism the amount indexed on said indexing means; the combination of means controllable by said register, in accordance with the amount contained therein, subsequently to the end of the first of said successive machine cycles and prior to operation of said register by said actuator means in the second of said successive machine cycles, means controllable by said indexing means subsequently to the end of the first of said successive machine cycles and prior to operation of said register by said actuator means in the second of said successive machine cycles, and means conditionable jointly by both of said controllable means subsequently to the end of the first of said successive machine cycles and prior to operation of said register by said actuator means in the second of said successive machine cycles and in accordance with the amounts contained in said register and indexed on said indexing means.

7. A calculating machine having means to drive it through single cycle operations, amount indexing means indexable while said machine is at rest between two successive machine cycles, actuator means operable by said driving means and controlled by said indexing means in at least the second of said successive machine cycles, a register operable by said actuator means in at least the second of said successive machine cycles to enter into said registering mechanism the amount indexed on said indexing means, means controllable, while the machine is at rest between said two successive cycles, by said register in accordance with the amount contained therein, means controllable, while the machine is at rest between said two successive cycles, by said indexing means in accordance with the amount indexed thereon, and means conditionable jointly by both of said controllable means in accordance with the amounts contained in said register and indexed on said indexing means.

8. In a calculating machine having means to drive it through single cycle operations, amount indexing means indexable while said machine is at rest between two successive machine cycles, and a register operable by said actuator means in at least the second of said successive machine cycles to enter into said registering mechanism the amount standing on said indexing means, the combination of means operable by said indexing means upon indexing thereof and in accordance with amounts indexed thereon, means controllable by said register, in accordance with the amount contained therein, subsequently to the end of the first of said successive machine cycles and prior to operation of said register by said actuator means in the second of said successive machine cycles, and means conditioned by both of said operable and controllable means subsequently to the end of the first of said successive machine cycles and prior to operation of said register in the second of said successive machine cycles in accordance with the amounts contained in said register and indexed on said indexing means.

9. A calculating machine having means to drive it through single cycle operations, amount indexing means indexable while said machine is at rest between two successive machine cycles, actuator means operable by said driving means and controlled by said indexing means in at least the second of said successive machine cycles, a register operable by said actuator means in at least the second of said successive machine cycles to enter into said registering mechanism the amount indexed on said indexing means; means operable by said indexing means upon indexing thereof and in accordance with amounts indexed thereon, sensable means controlled by said register in accordance with amounts contained therein, means to sense said sensable means, means to cause said sensing means to be effective at least subsequently to the first of said successive machine cycles and prior to operation of said register by said actuator means in the second of said successive machine cycles, and means conditioned jointly by said operable means and said sensing means while the latter is effective.

10. In a calculating machine having means to drive it through single cycle operations, amount indexing means indexable while said machine is at rest between two successive machine cycles, actuator means operable by said driving means and controlled by said indexing means in at least the second of said successive machine cycles, and a register operable by said actuator means in at least the second of said successive machine cycles to enter into said registering mechanism the amount standing on said indexing means; the combination of means controllable by said register, in accordance with the amount contained therein, while said machine is at rest between said successive machine cycles, means controllable by said indexing means while said machine is at rest between said successive machine cycles; means conditionable while said machine is at rest between said successive machine cycles jointly by both of said controllable means in accordance with the amounts contained in said register and indexed on said indexing means, and means controlled by said conditionable means to disable said driving means while said indexing means has indexed thereon an amount which, if entered into said register, would cause a predetermined numerical condition therein.

11. In a calculating machine of the class described having a motor driving means, a normally effective first manipulative means to cause said motor driving means to drive said machine through single cycle operations, registering mechanism, amount indexing means indexable while said machine is at rest between two successive machine cycles, means for entering in said registering mechanism, in at least the second of said successive machine cycles, an item indexed in said indexing means, a normally ineffective second manipulative means to cause said driving means to give said machine a cycle of operation, and automatic means governed both by said indexing means in accordance with the amount indexed thereon and by said registering mechanism in accordance with its numerical condition while said machine is at rest between said successive machine cycles, to disable the first and enable the second of said manipulative means when said indexed item is such that, if it were to be entered in said registering mechanism, it would cause a predetermined numerical condition therein.

12. A calculating machine of the class described comprising means for giving it cycles of operation, a registering mechanism, amount indexing means, means for entering in said registering mechanism, in a machine cycle, an amount indexed in said indexing means prior to said machine cycle, means governed by said indexing means and by said registering mechanism in accordance with its numerical condition upon the indexing of an item in said indexing means, and means conditioned by said governed means, upon the indexing of an item which, if it were to be entered in said registering mechanism, would cause an undesired numerical condition therein, to cause the indexed item not to be entered in said registering mechanism by said entering means in said machine cycle.

13. A calculating machine having means to drive it through single cycle operations, amount indexing means indexable while said machine is at rest between successive machine cycles, actuator means operable by said driving means and controlled by said indexing means in at least the second of said successive machine cycles, a register operable by said actuator means in at least the second of said successive machine cycles to enter into said registering mechanism the amount standing on said indexing means, a signaling means, and means controllable subsequently to the end of the first of said successive machine cycles and prior to operation of said register by said actuator means in the second of said successive machine cycles both by said register in accordance with the amount contained therein and by said indexing means in accordance with the amount indexed thereon to render said signaling means operative if the amount indexed upon said indexing means, if it were entered into said register, would cause a predetermined numerical condition therein.

14. A calculating machine of the class described having means for giving it cycles of operation, registering mechanism, amount indexing means, means for entering in said registering mechanism, in a machine cycle, an item indexed in said indexing means prior to said machine cycle and following the immediately preceding machine cycle, a conditionable means, and means governed by said indexing means and by said registering mechanism in accordance with the numerical conditions of both at the time said item is indexed in said indexing means and prior to said machine cycle to condition said conditionable means if said indexed item is such that, if it were to be entered in said registering mechanism, it would cause a predetermined numerical condition therein.

ARTHUR J. FETTIG.

CERTIFICATE OF CORRECTION.

Patent No. 2,358,154. September 12, 1944.

ARTHUR J. FETTIG.

It is hereby certified that error appears in the printed specification of the above numbered patent requiring correction as follows: Page 10, second column, line 60, claim 5, before the word "totalizer" insert --control means for controlling said--; and that the said Letters Patent should be read with this correction therein that the same may conform to the record of the case in the Patent Office.

Signed and sealed this 14th day of November, A. D. 1944.

Leslie Frazer

(Seal)

Acting Commissioner of Patents.